US007904625B1

(12) United States Patent
Jiang et al.

(10) Patent No.: US 7,904,625 B1
(45) Date of Patent: Mar. 8, 2011

(54) POWER SAVINGS FOR UNIVERSAL SERIAL BUS DEVICES

(75) Inventors: Yong Jiang, San Jose, CA (US); Zhenyu Zhang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/269,212

(22) Filed: Nov. 12, 2008

Related U.S. Application Data

(60) Provisional application No. 60/988,270, filed on Nov. 15, 2007.

(51) Int. Cl.
G06F 13/10 (2006.01)
G06F 13/38 (2006.01)

(52) U.S. Cl. .......................... 710/110; 710/100; 710/104

(58) Field of Classification Search .................. 710/104, 710/105, 110, 8, 12, 14–16, 62, 100, 305, 710/313
See application file for complete search history.

(56) References Cited

U.S. PATENT DOCUMENTS

| | | | | |
|---|---|---|---|---|
| 6,141,719 A * | 10/2000 | Rafferty et al. | ............... | 710/316 |
| 6,543,690 B2 * | 4/2003 | Leydier et al. | ................. | 235/451 |
| 6,820,166 B2 * | 11/2004 | Kitagawa | ....................... | 710/316 |
| 6,871,252 B1 * | 3/2005 | Cline | ............................ | 710/313 |
| 6,907,492 B2 * | 6/2005 | Matsuda et al. | ............... | 710/313 |
| 7,076,683 B2 * | 7/2006 | Saito et al. | ..................... | 713/601 |
| 7,277,966 B2 * | 10/2007 | Hanson et al. | .................. | 710/16 |
| 7,360,192 B2 * | 4/2008 | Komatsu et al. | .................. | 716/8 |
| 7,583,105 B2 * | 9/2009 | Stopel et al. | .................... | 326/85 |
| 2002/0169915 A1 * | 11/2002 | Wu | ............................... | 710/305 |
| 2003/0206547 A1 * | 11/2003 | Cho | ............................... | 370/364 |
| 2005/0134309 A1 * | 6/2005 | Komatsu et al. | ................ | 326/47 |
| 2008/0071940 A1 * | 3/2008 | Kim et al. | ....................... | 710/19 |

* cited by examiner

*Primary Examiner* — Mark Rinehart
*Assistant Examiner* — Trisha Vu

(57) ABSTRACT

An apparatus includes a Universal Serial Bus (USB) transceiver of a USB host controller, a first pull-down resistor, a first switch, a second pull-down resistor, a second switch, and a detachment module. The USB transceiver has a differential output. The first switch electrically couples the first pull-down resistor to a positive terminal of the differential output in response to a first switch control signal. The second switch electrically couples the second pull-down resistor to a negative terminal of the differential output in response to a second switch control signal. The detachment module selectively determines whether a USB device is electrically coupled to the differential output by checking a voltage at the differential output while at least one of the first switch control signal or the second switch control signal is asserted. The detachment module determines whether the USB device is electrically coupled to the differential output by checking the positive terminal when the USB transceiver is in a full-speed idle state and by checking the negative terminal when the USB transceiver is in a low-speed idle state.

13 Claims, 4 Drawing Sheets

POWER SAVINGS FOR UNIVERSAL SERIAL BUS DEVICES

CROSS-REFERENCE TO RELATED APPLICATIONS

This application claims the benefit of U.S. Provisional Patent Application Ser. No. 60/988,270, filed Nov. 15, 2007, the disclosure thereof incorporated by reference herein in its entirety.

BACKGROUND

The present disclosure relates generally to Universal Serial Bus (USB) devices. More particularly, the present disclosure relates to power savings for USB devices.

FIG. 1 shows a prior art full-speed USB communication system 100 in which a USB host or hub 102 is connected to a full-speed USB device 104. Referring to FIG. 1, USB host or hub 102 includes a USB host controller transceiver 106 having a differential output. To detect the presence of USB devices 104, each terminal of the differential output has a respective pull-down resistor R1, R2 each having a resistance of 15 kΩ±5%.

Full-speed USB device 104 includes a full-speed USB device transceiver 108 having a differential output. A pull-up resistor R3 having a resistance of 1.51 kΩ±5% is connected to the D+terminal to indicate that USB device 104 is a full-speed USB device.

FIG. 2 shows a prior art low-speed USB communication system 200 in which USB host or hub 102 of FIG. 1 is connected to a low-speed USB device 204. Referring to FIG. 2, low-speed USB device 204 includes a low-speed USB device transceiver 208 having a differential output. A pull-up resistor R4 having a resistance of 1.5 kΩ±5% is connected to the D−terminal to indicate that USB device 204 is a low-speed USB device.

With a pull-up voltage V+=3.3V, these arrangements generate a minimum current I=200 µA, as shown on the D+ line in FIG. 1, and on the D− line in FIG. 2. While 200 µA is not a significant current for a large device such as a computer, it constitutes a significant power drain for smaller portable devices such as personal digital assistants, cell phones, and the like.

SUMMARY

In general, in one aspect, an embodiment features an apparatus comprising: a Universal Serial Bus (USB) transceiver, wherein the USB transceiver has a differential output; a first pull-down resistor; a first switch to electrically couple the first pull-down resistor to a positive terminal of the differential output in response to a first switch control signal; a second pull-down resistor; and a second switch to electrically couple the second pull-down resistor to a negative terminal of the differential output in response to a second switch control signal.

Embodiments of the apparatus can include one or more of the following features. Some embodiments comprise a detachment module to determine whether a USB device is electrically coupled to the differential output while at least one of the switch control signals is asserted. Some embodiments comprise a switch controller to assert the at least one of the switch control signals during at least one of a low-speed idle state of the USB transceiver; a full-speed idle state of the USB transceiver; and a suspended mode of the USB transceiver. In some embodiments, the switch controller asserts the first switch control signal when the USB transceiver is in a full-speed idle state; and wherein the switch controller asserts the second switch control signal when the USB transceiver is in a low-speed idle state. Some embodiments comprise a device comprising the apparatus, wherein the device is selected from the group consisting of: a USB host; and a USB hub.

In general, in one aspect, an embodiment features a method comprising: electrically coupling a first pull-down resistor to a positive terminal of a differential output of a Universal Serial Bus (USB) transceiver in response to a first switch control signal; and electrically coupling a second pull-down resistor to a negative terminal of the differential output of the USB transceiver in response to a second switch control signal.

Embodiments of the method can include one or more of the following features. Some embodiments comprise determining whether a USB device is electrically coupled to the differential output of the USB transceiver while at least one of the switch control signals is asserted. Some embodiments comprise asserting the at least one of the switch control signals during at least one of a low-speed idle state of the USB transceiver; a full-speed idle state of the USB transceiver; and a suspended mode of the USB transceiver. Some embodiments comprise asserting the first switch control signal when the USB transceiver is in a full-speed idle state; and asserting the second switch control signal when the USB transceiver is in a low-speed idle state.

In general, in one aspect, an embodiment features a computer program comprising: instructions for electrically coupling a first pull-down resistor to a positive terminal of a differential output of a Universal Serial Bus (USB) transceiver in response to a first switch control signal; and instructions for electrically coupling a second pull-down resistor to a negative terminal of the differential output of the USB transceiver in response to a second switch control signal.

Embodiments of the computer program can include one or more of the following features. Some embodiments comprise instructions for determining whether a USB device is electrically coupled to the differential output of the USB transceiver while at least one of the switch control signals is asserted. Some embodiments comprise instructions for asserting the at least one of the switch control signals during at least one of a low-speed idle state of the USB transceiver; a full-speed idle state of the USB transceiver; and a suspended mode of the USB transceiver. Some embodiments comprise instructions for asserting the first switch control signal when the USB transceiver is in a full-speed idle state; and instructions for asserting the second switch control signal when the USB transceiver is in a low-speed idle state.

The details of one or more implementations are set forth in the accompanying drawings and the description below. Other features will be apparent from the description and drawings, and from the claims.

Figure 1:
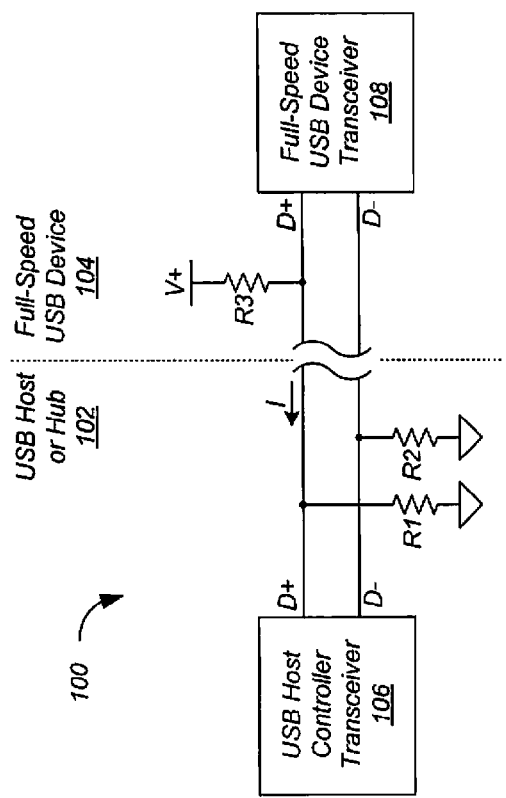
FIG. 1 shows a prior art full-speed USB communication system in which a USB host or hub is connected to a full-speed USB device.
Figure 2:
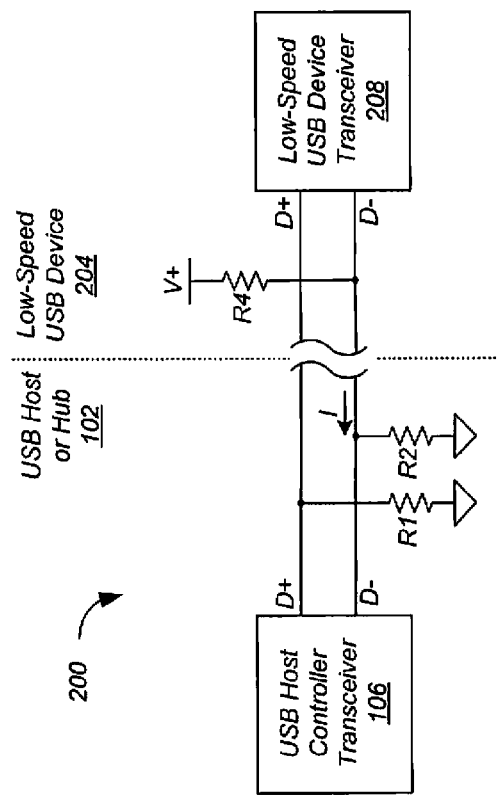
FIG. 2 shows a prior art low-speed USB communication system in which the USB host or hub of FIG. 1 is connected to a low-speed USB device.

The leading digit(s) of each reference numeral used in this specification indicates the number of the drawing in which the reference numeral first appears.

DETAILED DESCRIPTION

The subject matter of the present disclosure relates to power savings for Universal Serial Bus (USB) devices. In various embodiments, at least one of the pull-down resistors for the host controller transceiver is electrically decoupled from the host controller transceiver, and is occasionally electrically coupled to the host controller transceiver in order to determine whether a USB device is connected.

Figure 3:
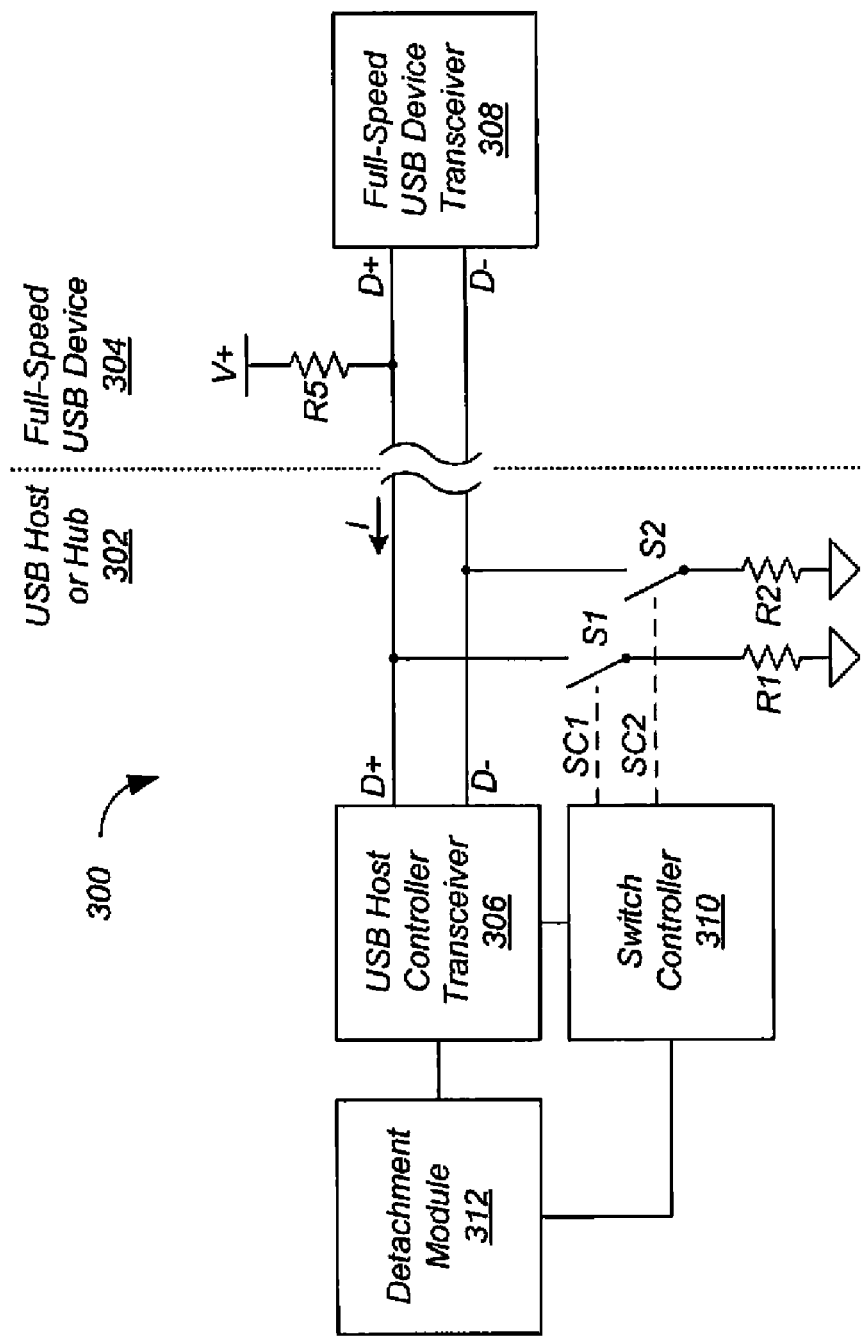
FIG. 3 shows a USB communication system in which a USB host or hub implemented according to an embodiment of the present invention is connected to a full-speed USB device.

FIG. 3 shows a USB communication system 300 in which a USB host or hub 302 implemented according to an embodiment of the present invention is connected to a full-speed USB device 304. Referring to FIG. 3, USB device 304 includes a full-speed USB device transceiver 308. USB device 304 also includes a pull-up resistor R5 having a resistance of 1.5 kΩ±5% connected to the D+terminal to indicate that USB device 304 is a full-speed device.

USB host or hub 302 includes a USB host controller transceiver 306 having a differential output. To detect the presence of USB devices such as USB device 304, each terminal of the differential output has a respective pull-down resistor R1, R2 each having a resistance of 15 kΩ±5%. In contrast to prior art USB hosts and hubs, each pull-down resistor R1, R2 can be electrically decoupled from the differential output of USB host controller transceiver 306 by a respective switch S1, S2. USB host controller transceiver 306 includes a switch controller 310. In some embodiments, switch controller 310 controls switches S1, S2 using switch control signals SC1, SC2, respectively. In other embodiments, switch controller 310 controls both switches S1, S2 using a single switch control signal. USB host controller transceiver 306 also includes a detachment module 312 to check for USB device detachment, that is, to determine whether a USB device such as USB device 304 is connected.

Figure 4:
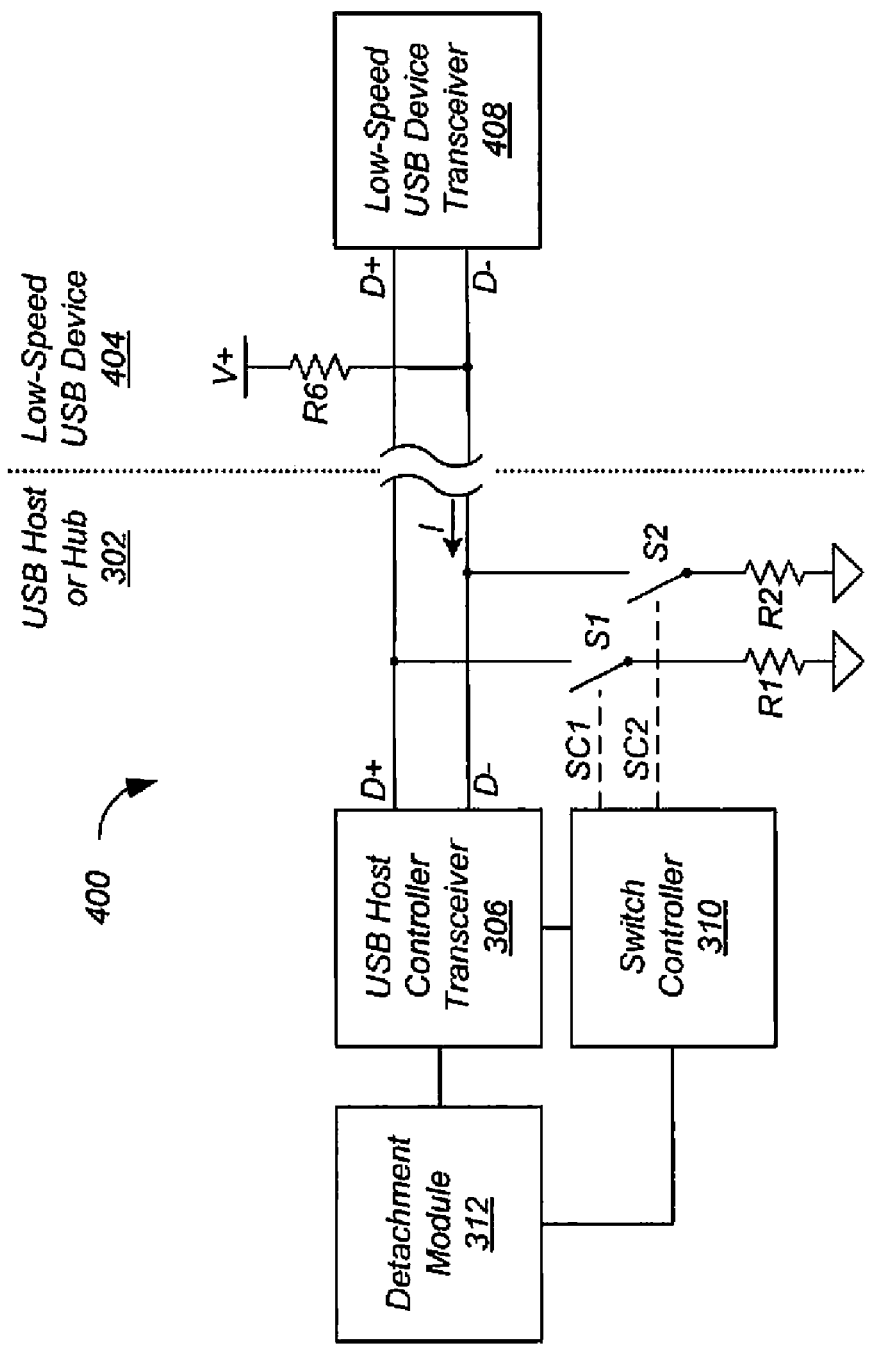
FIG. 4 shows a USB communication system in which the USB host or hub of FIG. 3 is connected to a low-speed USB device.

FIG. 4 shows a USB communication system 400 in which USB host or hub 302 of FIG. 3 is connected to a low-speed USB device 404. Referring to FIG. 4, USB device 404 includes a low-speed USB device transceiver 408. USB device 404 also includes a pull-up resistor R6 having a resistance of 1.5 kΩ±5% connected to the D-terminal to indicate that USB device 404 is a low-speed device.

Although in the described embodiments, the elements of the USB communication systems of FIGS. 3 and 4 are presented in one arrangement, other embodiments may feature other arrangements, as will be apparent to one skilled in the relevant arts based on the disclosure and teachings provided herein. For example, the elements of the USB communication systems of FIGS. 3 and 4 can be implemented in hardware, software, or combinations thereof.

Figure 5:
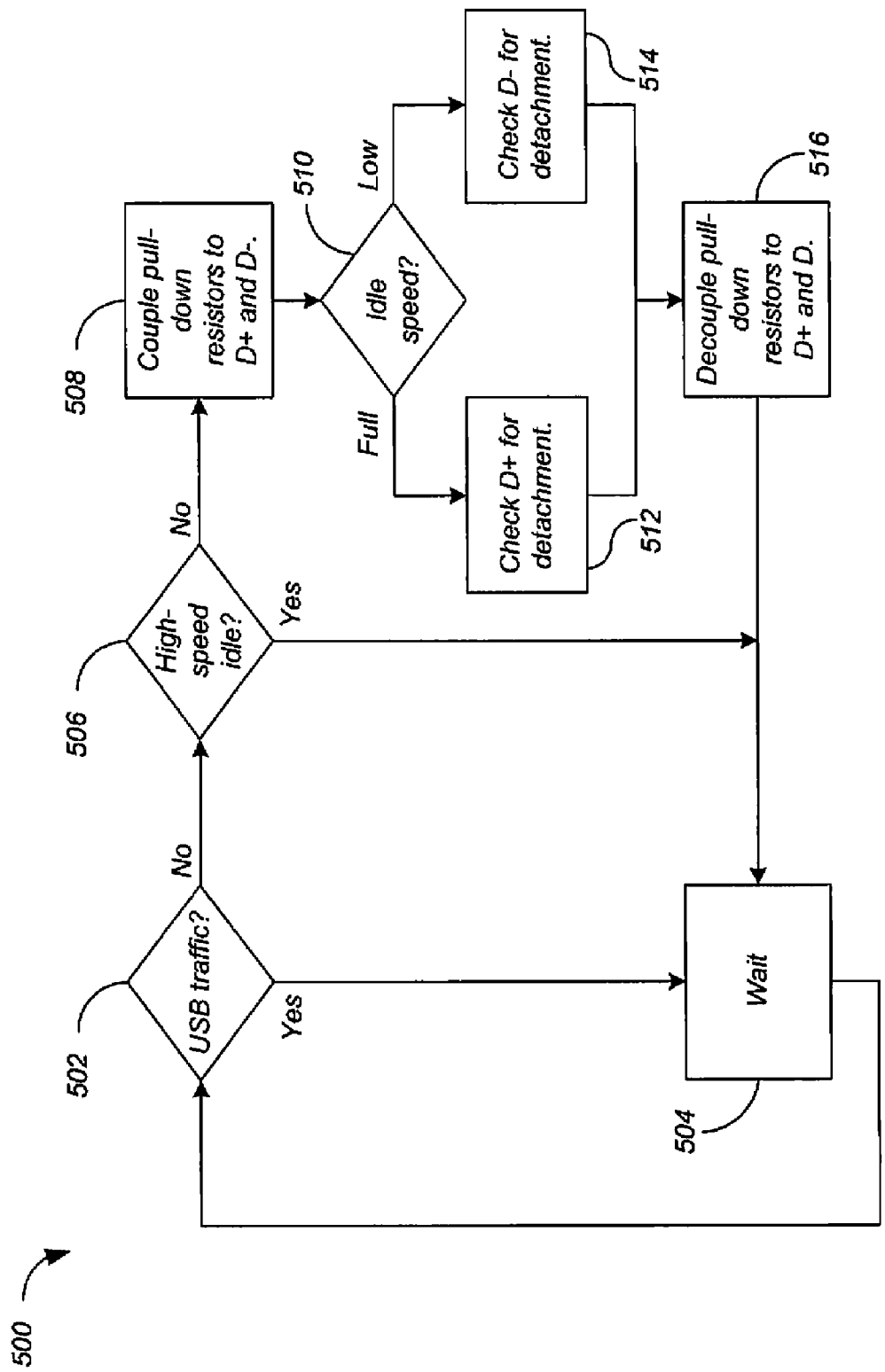
FIG. 5 shows a process for the USB host or hub of FIGS. 3 and 4 to check for USB device detachment according to one embodiment.

FIG. 5 shows a process 500 for USB host or hub 302 of FIGS. 3 and 4 to check for USB device detachment according to one embodiment. Although in the described embodiments, the elements of process 500 are presented in one arrangement, other embodiments may feature other arrangements, as will be apparent to one skilled in the relevant arts based on the disclosure and teachings provided herein. For example, in various embodiments, some or all of the steps of process 500 can be executed in a different order, concurrently, and the like.

Referring to FIG. 5, when process 500 begins, pull-down resistors R1, R2 are electrically decoupled from the differential output of USB host controller transceiver 306 by switches S1, S2, respectively. If traffic is present on the USB connection (step 502), no detachment check is performed, and instead a predetermined detachment check period is allowed to elapse (step 504) before process 500 repeats (at step 502). Switch controller 310 also allows the predetermined detachment check period to elapse (step 504) if no traffic is present on the USB connection (step 502), but USB host controller transceiver 306 is in a high-speed idle state (step 506).

If no traffic is present on the USB connection (step 502), and USB host controller transceiver 306 is not in a high-speed idle state (step 506), then switch controller 310 asserts both switch control signals SC1, SC2. In response to switch control signals SC1, SC2, switches S1, S2 electrically couple pull-down resistors R1, R2, respectively, to the differential output of USB host controller transceiver 306 (step 508).

In other embodiments, switch controller 310 can assert switch control signals SC1, SC2 separately, depending on the speed of the idle state. In particular, when USB host controller transceiver 306 is in full-speed idle state, switch controller 310 can assert switch control signal SC1 only, thereby electrically coupling pull-down resistor R1 to the positive (D+) terminal of the differential output of USB host controller transceiver 306. Similarly, when USB host controller transceiver 306 is in low-speed idle state, switch controller 310 can assert switch control signal SC2 only, thereby electrically coupling pull-down resistor R2 to the negative (D−) terminal of the differential output of USB host controller transceiver 306.

Referring again to FIGS. 3 and 5, with both pull-down resistors R1, R2 electrically coupled to the differential output of USB host controller transceiver 306, detachment module 312 determines whether a USB device is electrically coupled to the differential output of USB host controller transceiver 306. This determination can be made, for example, by checking the voltage at the differential output of USB host controller transceiver 306. Detachment module 312 makes this determination while switch control signals SC1, SC2 are asserted, for example in response to switch control signals SC1, SC2.

If USB host controller transceiver 306 is in a full-speed idle state (step 510), then detachment module 312 checks the positive (D+) terminal of the differential output of USB host controller transceiver 306 to determine whether a USB device is electrically coupled to the differential output of USB host controller transceiver 306 (step 512). If USB host controller transceiver 306 is in a low-speed idle state (step 510), then detachment module 312 checks the negative (D−) terminal of the differential output of USB host controller transceiver 306 to determine whether a USB device is electrically coupled to the differential output of USB host controller transceiver 306 (step 514).

After a predetermined detachment check duration, switch controller 310 negates both switch control signals SC1, SC2. In response to switch control signals SC1, SC2, switches S1, S2 electrically decouple pull-down resistors R1, R2, respectively, from the differential output of USB host controller transceiver 306 (step 516). Then the predetermined detachment check period is allowed to elapse (step 504) before process 500 repeats (at step 502).

Any duty cycle can be chosen for the detachment check duration and detachment check period. For example, the detachment check duration can be set at 3 μs, and the detachment check period can be set at 3 ms. This yields a duty cycle of 0.001, which reduces current I from an average of 200 µA to an average of 0.2 µA, with a corresponding reduction in power consumption.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. An apparatus comprising:
   a Universal Serial Bus (USB) transceiver of a USB host controller, wherein the USB transceiver has a differential output;
   a first pull-down resistor;
   a first switch to electrically couple the first pull-down resistor to a positive terminal of the differential output in response to a first switch control signal;
   a second pull-down resistor;
   a second switch to electrically couple the second pull-down resistor to a negative terminal of the differential output in response to a second switch control signal; and
   a detachment module to selectively determine whether a USB device is electrically coupled to the differential output by checking a voltage at the differential output while at least one of the first switch control signal or the second switch control signal is asserted,
   wherein the detachment module determines whether the USB device is electrically coupled to the differential output by
   checking the positive terminal when the USB transceiver is in a full-speed idle state, and
   checking the negative terminal when the USB transceiver is in a low-speed idle state.

2. The apparatus of claim 1, further comprising:
   a switch controller to assert the at least one of the first switch control signal or the second switch control signal during at least one of
   a low-speed idle state of the USB transceiver;
   a full-speed idle state of the USB transceiver; or
   a suspended mode of the USB transceiver.

3. The apparatus of claim 2:
   wherein the switch controller asserts the first switch control signal when the USB transceiver is in a full-speed idle state; and
   wherein the switch controller asserts the second switch control signal when the USB transceiver is in a low-speed idle state.

4. A device comprising the apparatus of claim 1, wherein the device is selected from the group consisting of:
   a USB host; and
   a USB hub.

5. The apparatus of claim 1, further comprising:
   a switch controller to assert the first switch control signal and the second switch control signal when:
   no traffic is present on the differential output; and
   the USB transceiver is not in a high-speed idle state.

6. The apparatus of claim 1:
   wherein the detachment module waits for a predetermined period before determining whether the USB device is electrically coupled to the differential output when:
   traffic is present on the differential output; or
   no traffic is present on the differential output and when the USB transceiver is in a high-speed idle state.

7. A method comprising:
   electrically coupling a first pull-down resistor to a positive terminal of a differential output of a Universal Serial Bus (USB) transceiver of a USB host controller in response to a first switch control signal;
   electrically coupling a second pull-down resistor to a negative terminal of the differential output of the USB transceiver in response to a second switch control signal; and
   selectively determining whether a USB device is electrically coupled to the differential output by checking a voltage at the differential output while at least one of the first switch control signal or the second switch control signal is asserted,
   wherein determining whether the USB device is electrically coupled to the differential output includes
   checking the positive terminal when the USB transceiver is in a full-speed idle state, and
   checking the negative terminal when the USB transceiver is in a low-speed idle state.

8. The method of claim 7, further comprising:
   asserting the at least one of the first switch control signal or the second switch control signal during at least one of
   a low-speed idle state of the USB transceiver;
   a full-speed idle state of the USB transceiver, or
   a suspended mode of the USB transceiver.

9. The method of claim 8, further comprising:
   asserting the first switch control signal when the USB transceiver is in a full-speed idle state; and
   asserting the second switch control signal when the USB transceiver is in a low-speed idle state.

10. A computer program stored on a computer-readable storage device and executable by a processor, the computer program comprising:
    instructions for electrically coupling a first pull-down resistor to a positive terminal of a differential output of a Universal Serial Bus (USB) transceiver of a USB host controller in response to a first switch control signal;

instructions for electrically coupling a second pull-down resistor to a negative terminal of the differential output of the USB transceiver in response to a second switch control signal;

instructions for determining whether a USB device is electrically coupled to the differential output by checking a voltage at the differential output while at least one of the first switch control signal and the second switch control signal is asserted; and instructions for determining whether the USB device is electrically coupled to the differential output by
- checking the positive terminal when the USB transceiver is in a full-speed idle state, and
- checking the negative terminal when the USB transceiver is in a low-speed idle state.

11. The computer program of claim 10, further comprising:

instructions for asserting the at least one of the first switch control signal or the second switch control signal during at least one of a low-speed idle state of the USB transceiver;

a full-speed idle state of the USB transceiver; or a suspended mode of the USB transceiver.

12. The computer program of claim 11, further comprising:

instructions for asserting the first switch control signal when the USB transceiver is in a full-speed idle state; and instructions for asserting the second switch control signal when the USB transceiver is in a low-speed idle state.

13. An apparatus comprising:

a Universal Serial Bus (USB) transceiver of a USB host controller, wherein the USB transceiver has a differential output;

a first pull-down resistor;

a first switch to electrically couple the first pull-down resistor to a positive terminal of the differential output in response to a first switch control signal;

a second pull-down resistor;

a second switch to electrically couple the second pull-down resistor to a negative terminal of the differential output in response to a second switch control signal;

a detachment module to selectively determine whether a USB device is electrically coupled to the differential output by checking a voltage at the differential output while at least one of the first switch control signal or the second switch control signal is asserted; and a switch controller to negate the first switch control signal and the second switch control signal when a first predetermined period elapses after the first switch control signal and the second switch control signal are asserted, wherein the detachment module waits for a second predetermined period before again determining whether the USB device is electrically coupled to the differential output, and wherein a duty cycle of the first predetermined period and the second predetermined period determines a value of current through the differential output.

* * * * *